June 9, 1964

A. C. OLSON ETAL 3,136,467

PINCH ROLLER DRIVE MECHANISM

Filed March 26, 1962

3 Sheets-Sheet 1

INVENTORS
ALVIN C. OLSON
NORMAN MALKIN

BY Douglas M. Clarkson

ATTORNEY

June 9, 1964 A. C. OLSON ETAL 3,136,467

PINCH ROLLER DRIVE MECHANISM

Filed March 26, 1962

3 Sheets-Sheet 2

INVENTORS
ALVIN C. OLSON
NORMAN MALKIN

BY

ATTORNEY

PINCH ROLLER DRIVE MECHANISM

Filed March 26, 1962 3 Sheets-Sheet 3

INVENTORS
ALVIN C. OLSON
NORMAN MALKIN
BY
Douglas M. Clarkson
ATTORNEY

United States Patent Office 3,136,467 Patented June 9, 1964

3,136,467

PINCH ROLLER DRIVE MECHANISM

Alvin C. Olson, Huntington Station, and Norman Malkin, Flushing, N.Y., assignors to Potter Instrument Company, Inc., Plainview, N.Y., a corporation of New York Filed Mar. 26, 1962, Ser. No. 182,550
11 Claims. (Cl. 226—177)

The present invention, generally, relates to tape handler apparatus and, more particularly, to such apparatus including a new and improved tape drive mechanism.

In tape handler apparatus as used today, it is essential that the tape be moveable, including starting and stopping, at extremely high speed. This requirement is due in part to recent advances in technology involving the electronics which permits reading and writing information on tapes at very high speeds.

Since it is now feasible to read and write information at very high speeds, it is necessary to be able to develop fast movement in the tape. However, it is extremely difficult to develop movement in tape which will keep pace with the electrical requirements of the system since any drive means for the tape is inherently of a mechanical nature involving such factors as inertia and delays in mechanical response to actuating signals.

It is a principal object of the present invention to provide a new and improved tape drive mechanism which is uniquely adapted to be operable at extremely high speeds.

It is also an object of the invention to provide a pinch roller drive mechanism with mechanical characteristics which permit movement of a tape on which information is processed at speeds commensurate with the requirements of the electrical portion in a tape handler apparatus.

Another object of the invention is to provide a pinch roller drive mechanism which admits of ready adjustment of selected parameters.

Briefly, a tape handler apparatus which includes a pinch roller drive mechanism in accordance with the principles of this invention may be either of the magnetic or perforated tape variety. The requirement, therefore, in such tape handler apparatus is that a transducer be adapted to transfer coded information between information processing apparatus and an elongated moving web, such as a tape.

Such apparatus includes a drive capstan having a source of motive power to cause rotational movement therein, and a pinch roller drive mechanism is supported in a predetermined spacial relationship with the drive capstan to pinch the tape against the drive capstan when movement of the tape is desired and to release the tape to permit stopping. The pinch roller drive mechanism, in accordance with the invention, includes a roller member formed of a predetermined material and resilient support means for the roller member to permit the roller member to be moved toward the drive capstan for pinching a tape to develop the desired movement.

A suitable means, such as an electromagnet, is provided to actuate the roller member by overcoming the bias force in the resilient support to move the roller member toward the drive capstan. The unique structural arrangement of the pinch roller drive mechanism permits the provision of a single adjustment feature for each of a plurality of operating characteristics.

The invention further resides in certain novel features of parts, and further objects and advantages thereof will become apparent to those skilled in the art to which it pertains from the following description of the presently preferred embodiment thereof described with respect to the accompanying drawings in which similar reference characters represent corresponding parts in the several views, in which.

Figure 1:
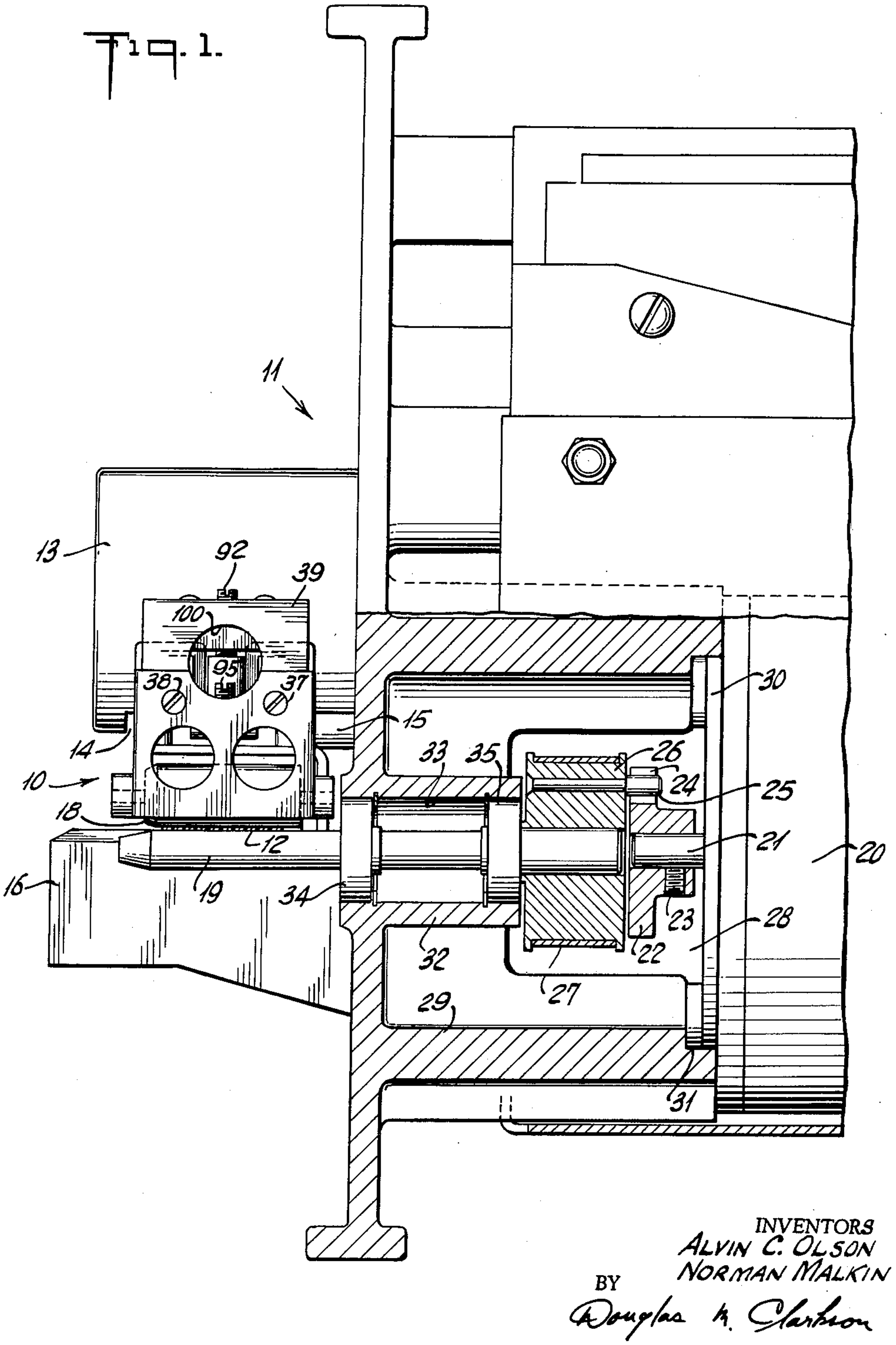
FIG. 1 is a side view in elevation partly in section of a tape handler apparatus including a pinch roller drive mechanism in accordance with the invention.
Figure 2:
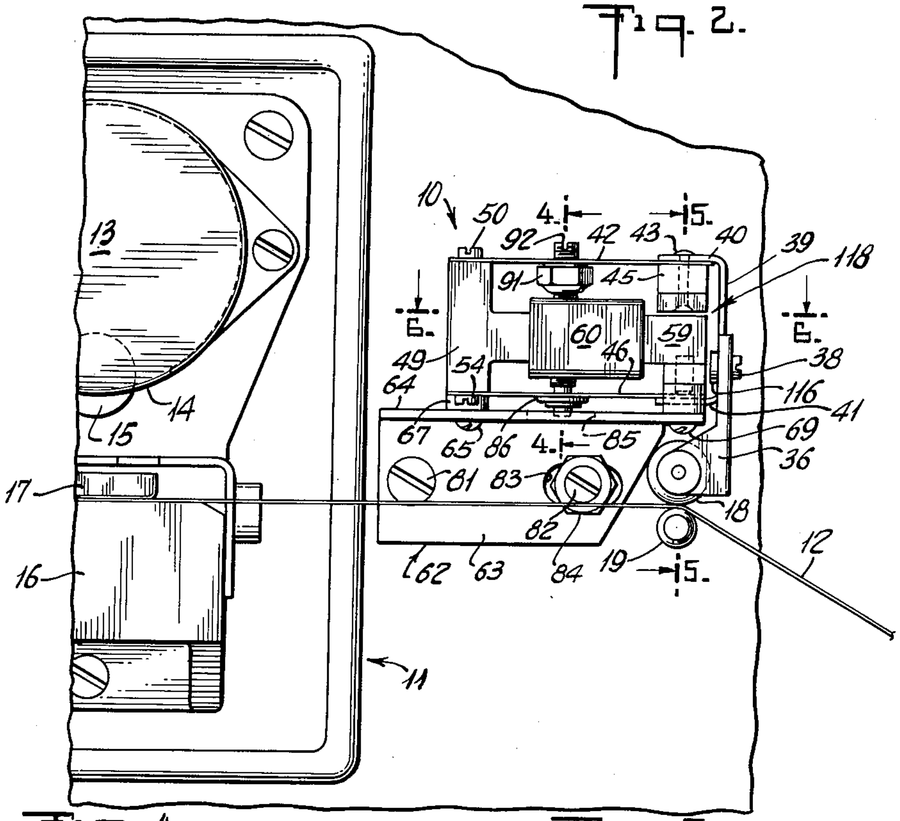
FIG. 2 is a front view in elevation showing a portion of a tape handler apparatus including the pinch roller drive mechanism of the invention.

Referring now to FIGS. 1 and 2 of the drawings, the pinch roller drive mechanism of the invention is identified generally by the numeral 10, and the views presented in these figures show the mechanism 10 in operating relationship with a tape handler apparatus, which is identified generally by the numeral 11. While the tape handler apparatus 11 may be operative on any of several principles, it is shown in the drawing as being of the perforated tape variety of apparatus.

To sense information, which is processed on a tape 12 by a plurality of perforations in a predetermined pattern, a source of radiation such as a light is enclosed in a housing 13 having an opening 14. A suitable lens 15 is positioned to condense the light rays and focus them through the perforations in the tape 12 to a suitable detector element, such as a photoelectric cell supported within a casing 16.

While any suitable mechanism may be used to bring the tape 12 to a stop, a brake element 17 is diagrammatically illustrated of a clamping means for stopping the tape 12 in response to a command either external of the apparatus or a signal processed directly on the tape.

The tape 12 is moved because of a pinch roller member 18 pressing the tape 12 against a drive capstan 19. The drive capstan 19 is rotated continuously by an electric motor 20 having a shaft 21. While any suitable motor device may be used for the motor 20, a hysteresis-synchronous A.-C. motor having a minimum pull-out torque of 15 ounce-inches is an example of one preferred device.

A disc 22 is fixedly attached to the motor shaft 21 by a setscrew 23 and has a slot 24 formed in the periphery thereof to receive a pin 25 extending from a pulley 26. The pulley 26 is fixedly attached to the drive capstan 19 so that even though the motor shaft 21 is completely separate from the drive capstan 19, the pin 25 extending into the slot 24 permits the drive capstan 19 to be rotated by the motor shaft 21.

In addition, the rotational power is supplied to other parts of the tape handler apparatus 11 by a belt 27 extending around the pulley 26 and out through an opening 28 in the housing 29. The motor 20 has a portion 30 of its casing formed of a predetermined peripheral configuration, and the housing 29 has a matching opening 31 to receive the casing portion 30. The housing 29 also has a hub 32 with an internal opening 33 in which is supported two bearings 34 and 35.

The pinch roller member 18 is moveable to pinch the tape 12, which is in the form of an elongated web, against the drive capstan 19, and since the drive capstan 19 is rotated due to the motor 20, linear motion is developed in the tape 12 in the direction of its length. The pinch roller member 18 is journaled in a first or lower bracket 36 which is fixedly attached by two screws 37 and 38 to a second or upper bracket 39 so that the bracket 36 in which the pinch roller member 18 is journaled is moveable as part of the moveable bracket 39.

The bracket 39 has a flange 40 at its upper end turned at substantially right angles to the direction of movement for the roller member 18, and a matching flange 41 at the lower end thereof. While these two flanges 40 and 41 are visible on the bracket 39 shown in FIG. 2, they are better seen in FIG. 3 of the drawings.

The upper flange 40 of the bracket 39 is attached to a first or upper leaf spring 42 by rivets 43 and 44 which extend also through an armature 45. The lower flange 41 of the bracket 39 is fixedly attached to a second or lower spring 46 by rivets 47 and 48, and while these parts are shown separately in FIG. 3, they are shown assembled in FIG. 5 of the drawings.

Figure 3:
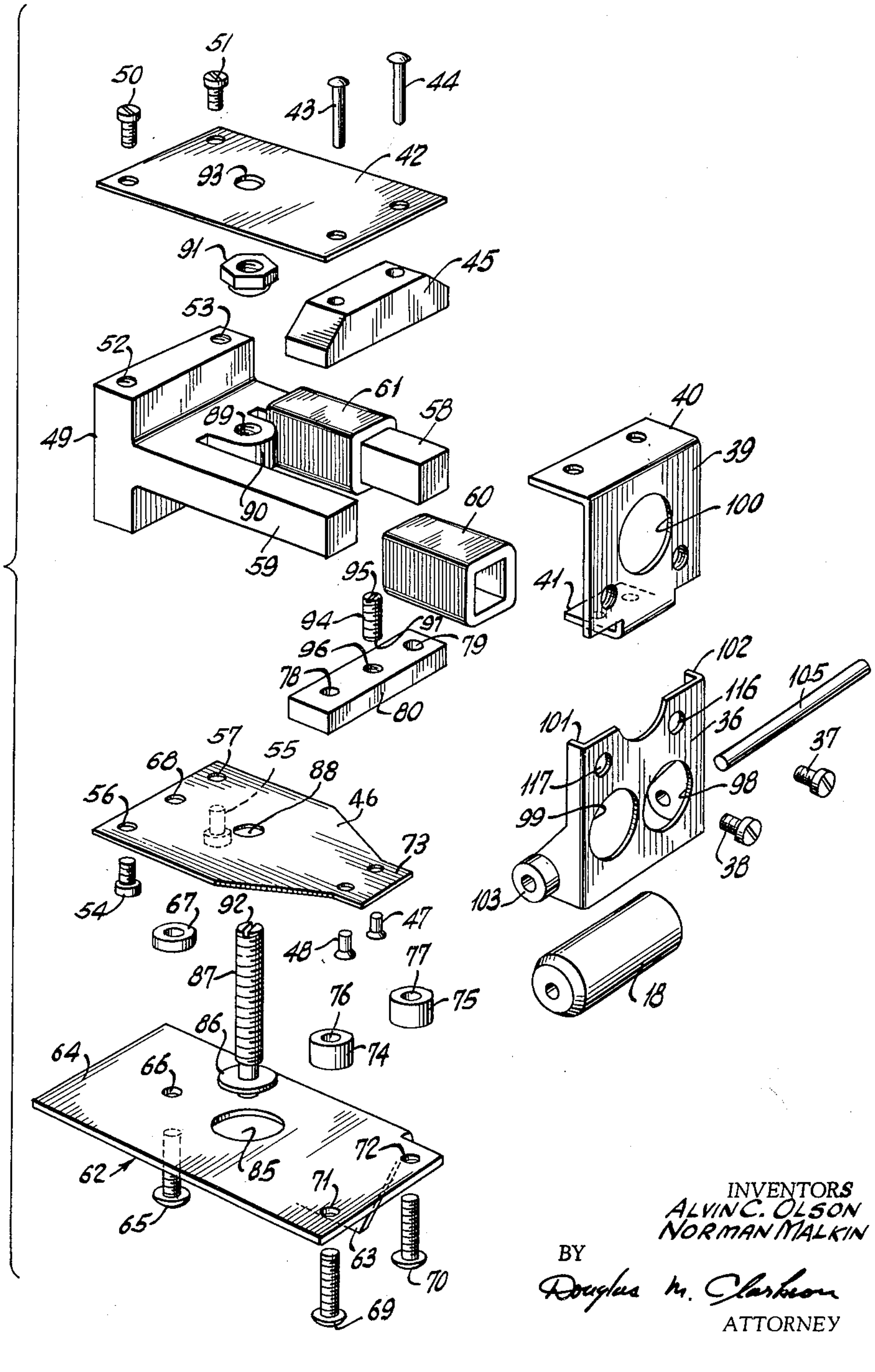
FIG. 3 is an exploded view showing the component parts embodied in the pinch roller drive mechanism of the invention.

The opposite ends of the two leaf springs 42 and 46 are fixedly attached to a block 49 by screws 50 and 51 threaded into holes 52 and 53, respectively, and screws 54 and 55 passing through apertures 56 and 57, respectively, by threading into corresponding holes in the lower edge of the block 49 similar to the holes 52 and 53 shown in FIG. 3.

The block 49 is a part of a magnetic core having two pole pieces 58 and 59 extending from the block 49 to a point just beneath the armature 45, as best seen in FIG. 2. A coil or winding 60 is formed to be positioned over the pole piece 59 or is formed directly on the pole piece 59, as desired, and a similar coil or winding 61 is formed to fit about the pole piece 58. Suitable electrical connections, not shown, provide means for applying electrical current to the coils 60 and 61 for energizing the magnetic poles 58 and 59 to attract the armature 45 and, thereby, deflecting the springs 42 and 46 downwardly, as viewed in FIG. 2, causing the pinch roller member 18 to pinch the tape 12 against the drive capstan 19.

The pinch roller drive mechanism 10 is mounted on the tape handler apparatus 11 by means of a mounting bracket 62 having a vertical flange 63 and a horizontal flange 64, as best seen in FIGS. 2 and 3. A screw 65, FIG. 3, extends through a clearance opening 66 in the flange 64, through a spacer washer 67, through a clearance opening 68 in the lower leaf spring 46 and is threaded into the lower edge of the block 49.

The two pole pieces 58 and 59 are secured to the flange 64 by means of two screws 69 and 70 extending up through clearance holes 71 and 72 in the flange 64, bypassing the leaf spring 46 because of the reduced width of the end 73 and because of the thickness of spacer washers 74 and 75 which have clearance openings 76 and 77, through clearance holes 78 and 79 in a plastic, fiber or non-magnetic metal bar 80 for threading into openings located on the underside of the two pole pieces 58 and 59. While these parts are shown separately in FIG. 3, they may be seen assembled in FIG. 5 of the drawings.

The vertical flange 63 of the support bracket 62, as seen in FIG. 2, has a screw 81 securing one end of the flange 63 to the panel of the tape handler apparatus 11, and it should be noted that the screw 81 is located adjacent the edge of the flange 63 furthermost from the pinch roller 18. A bolt 82 having an eccentric cam surface (not visible) is fitted through an opening 83 and threaded into the panel of the tape handler apparatus 11.

A nut 84 is tightened against the flange 63 to secure the bolt 82 in a pre-set rotational position and to lock the flange 63 tightly against the panel of the tape handler apparatus 11. This bolt 82 provides one of the adjustment features for the pinch roller drive mechanism 10, as will be described in greater detail presently.

A large opening 85 is provided in the horizontal flange 64 of the support bracket 62 to provide clearance for an annular flat surface 86 fixed to a threaded bolt 87. The bolt 87 passes through a clearance hole 88 in the lower leaf spring 46, is threaded within an opening 89 in a hub 90 located between the two magnet poles 58 and 59, through a threaded nut 91 so that the upper end 92 of the bolt 87 passes through a clearance hole 93 in the upper leaf spring 42. These parts are visibly assembled in FIGS. 2 and 4 of the drawings.

The upper end 92 of the bolt 87 has a screw driver slot so that the bolt 87 may be turned until the fixed flange 86 touches the lower surface of the lower leaf spring 46. Then, the nut 91 is turned until it touches the lower surface of the upper leaf spring 42. The end 92 of the bolt 87 provides a spring load adjustment feature, which will be described in more detail presently.

A bolt 94 having a screw driver slot in the upper end 95 is threaded downwardly through a threaded opening 96 in the non-magnetic bar 80 so that the lower end 97 of the bolt 94 rests against the end 73 of the lower leaf spring 46. These assembled parts are visible in FIG. 5 of the drawings. Thus, adjustment of the bolt 94 provides an upper limit of deflection for the springs 42 and 46, the brackets 36 and 39, and the pinch roller member 18, which will be described further hereinafter.

It will be noted that the brackets 36 and 39 have large circular openings 98, 99 and 100. These openings serve to reduce the mass of these brackets 36 and 39, and the opening 100 permits access to the end 95 of the bolt 94, as shown in FIGS. 1 and 5 of the drawings.

Figures 4, 5, 6:
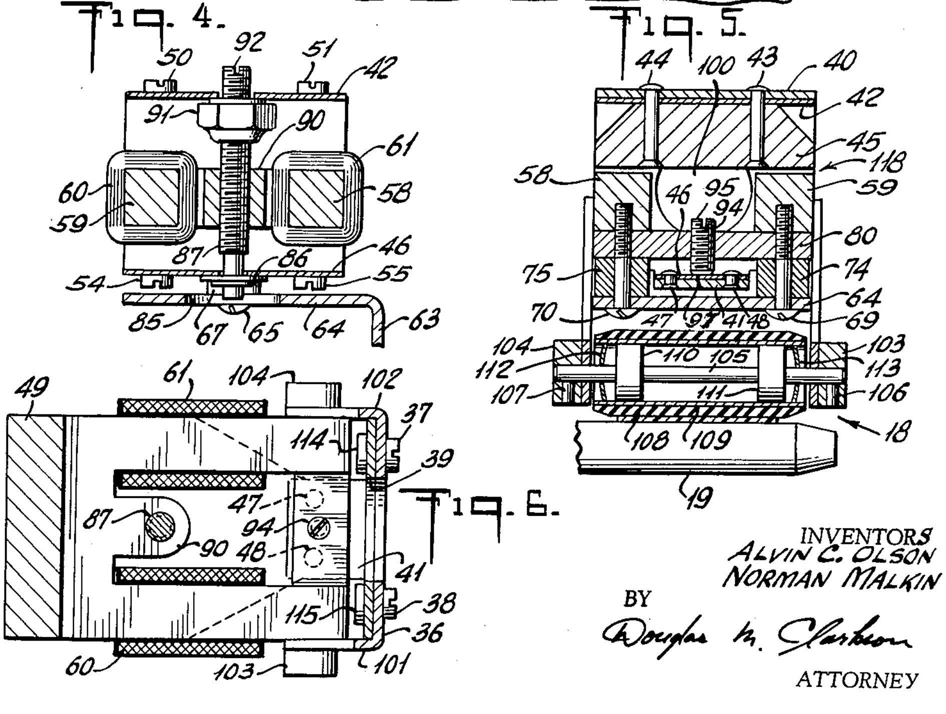
FIG. 4 is a view in cross section taken along the line 4—4 in FIG. 2.
FIG. 5 is a view in cross section taken along the line 5—5 in FIG. 2.
FIG. 6 is a view in cross section taken along the line 6—6 in FIG. 2.

The bracket 36 has its opposite vertical edges turned back as indicated by the numerals 101 and 102, FIGS. 3 and 6. A hub 103 is formed integrally with the lower end of the flange 101, and a matching hub 104, FIG. 6, is formed integrally with the flange 102.

A shaft 105 extends through the hub 103, through the roller member 18, and through the hub 104. Both ends of the shaft 105 are fixedly secured within the respective hubs 103 and 104 by setscrews 106 and 107.

As best seen in FIG. 5, the outer surface 108 of the roller member 18 is formed of a suitable, high frictional material, such as rubber or plastic for example, press fitted or otherwise attached to a metal cylinder 109. Two roller bearings 110 and 111 complete with dust seal rings 112 and 113 provide rotational support for the roller member 18 on the fixed shaft 105.

Since the two brackets 36 and 39 are formed of relatively thin material to reduce the mass and, therefore, the inertia even further, metallic inserts, such as available commercially under the name Pem-fasteners, are plugged into openings in the bracket 39 providing additional thickness at this point to support threads for receiving the screws 37 and 38, respectively. These plugs are indicated by the reference numerals 114 and 115 in FIG. 6 of the drawings.

As mentioned previously, the two screws 37 and 38 fixedly attach the bracket 36 to the bracket 39 for supporting the pinch roller member 18. The screws 37 and 38 pass through clearance holes 116 and 117 in the bracket 36 so that by loosening the two screws 37 and 38, the roller member 18 may be adjusted in position relative to the drive capstan 19 to obtain substantially complete parallelism between the axes of the roller member 18 and the drive capstan 19.

Having described the various component parts making up the structural arrangement of the pinch roller drive mechanism of the invention, the unique characteristics of this structure will become apparent from the following description of the adjustments which are obtainable easily and readily with this arrangement.

There are five principal adjustments that must be made to achieve maximum effectiveness in the operation of a mechanism of the type to which the invention pertains.

As viewed in FIG. 1, it is important that the axis of the pinch roller member 18 be as nearly parallel to the axis of the drive capstan 19 as possible. An adjustment is provided to achieve this parallelism by the two screws 37 and 38, and it will be noted that these two screws are readily accessible as in the bracket 36 which they secure.

A second adjustment is provided by the two screws 69 and 70, as viewed in FIG. 5, which control the plane in which the pinch roller member 18 is located. For example, it is important that the pinch roller member 18 be in the same plane as the drive capstan 19, as may be illustrated in FIG. 2 by the line 5—5 along which the view shown in FIG. 5 is taken.

By loosening the two screws 69 and 70, the entire assembly may be rotated slightly on the flange 64 about the axis of the screw 65 until alignment between the pinch roller member 18 and the drive capstan 19 is obtainable. Tightening the screws 69 and 70 maintain the alignment as preset.

A third adjustment for the mechanism of the invention is obtained by the screw 82 in the mounting bracket 62 to adjust the gap between the pinch roller member 18 and the drive capstan 19. This adjustment is obtained by loosening the nut 84, rotating the screw 82 so that the eccentric cam surface thereon (not visible) reacts with the slot 83 to pivot the entire mounting bracket 62 about the axis of the screw 81 until a desired gap is obtained between the pinch roller member 18 and the drive capstan 19. Tightening of the nut 84 maintains the mounting bracket 62 in this predetermined position.

A fourth adjustment is provided for the gap between the armature 45 and the poles 58 and 59, and this gap is identified by the numeral 118, FIG. 2. This adjustment is provided by the bolt 94, the upper end 95 of which has a screw driver slot which is accessible through the large circular opening 100 in the bracket 39. This upper end 95 of the screw 94 is visible in FIGS. 1 and 5 of the drawings.

As viewed in FIG. 5, turning the bolt 94 in the bar 80 adjusts the position of the end 97 against which the lower spring end 73 rests, and since the bracket 39 is attached to the spring 42 as well as the spring 46, the position of the upper spring 42 and the armature 45 attached thereto is adjusted to preset the gap 118.

A fifth adjustment is provided by the screw driver slot in the end 92 of the bolt 87, as viewed in FIGS. 2 and 4. This adjustment, which is readily accessible at the upper portion of the mechanism 10, adjusts the tension in the two leaf springs 42 and 46 as well as providing three point support for each of the springs 42 and 46.

In other words, the leaf spring 42 is supported at one end against the block 49, FIG. 3, by the two screws 50 and 51 and by the upper surface of the nut 91. The lower spring 46 is supported at one end against the lower edge of the block 49 by the two screws 54 and 55 and by the flange 86 on the bolt 87.

By first adjusting the bolt 94 through the large circular opening 100 in the front of the mechanism 10, the gap 118 between the armature 45 and the pole pieces 58 and 59 is preset. Then, by threatding the bolt 87 upwardly as viewed in FIG. 2 by turning the end 92, both of the springs 42 and 46 are given a pre-set bias load.

The gap 118 between the armature 45 and the poles 58 and 59 is set by placing a feeler gauge through the large circular opening 100 in the bracket 39 and should be in the order of approximately 0.019 inch. This gap 118 should be substantially the same between the armature 45 and each of the poles 58 and 59.

A spring scale may be used to measure the force necessary to pull the roller member 18 downwardly against the bias tension of the springs 42 and 46, and this force should be in the order of 9 ounces.

A feeler gauge may be used also to determine the gap between the roller member 18 and the drive capstan 19 with the magnet de-energized, and this clearance be in the order of 0.012 inch.

With the electromagnet energized, a spring scale may be used to measure the force required to lift the pinch roller member 18 from the drive capstan 19, and this force should be between 5 and 10 pounds.

The following claims are intended to define the valid scope of this invention over the prior art and to cover all changes and modifications falling within the true spirit and valid scope of the invention.

What is claimed is:

1. In a tape handler apparatus for processing information-bearing tape including,
 transducer means adapted to transfer coded information between information processing apparatus and an elongated moving web;
 a drive capstan including a motive power source to cause rotational movement therein; and
 a pinch roller drive mechanism supported in a predetermined spacial relationship with the drive capstan;
said pinch roller drive mechanism comprising:
 a roller member formed of a predetermined material;
 resilient spring means including mounting means at one end and support means for the roller member at the opposite end to permit the roller member to be moved toward the drive capstan for pinching a web to cause the web to be moved relative to the transducer means;
 means to actuate the roller member to cause it to overcome the bias force in the resilient support means to move toward the drive capstan; and
 a single adjustment means whereby the magnitude of bias force of the resilient support means is adjustable easily and readily.

2. In a tape handler apparatus for processing information-bearing tape including,
 transducer means adapted to transfer coded information between information processing apparatus and an elongated moving web;
 a drive capstan including a motive power source to cause rotational movement therein; and
 a pinch roller device supported in a predetermined spacial relationship with the drive capstan;
said pinch roller device comprising:
 a roller member formed of a predetermined material;
 resilient support means including two spring members having a preset bias force and spaced apart from each other in the direction of movement for the roller member to permit the roller member to be moved toward the drive capstan for pinching a web to cause the web to move relative to the transducer means;
 means to actuate the roller member to cause it to overcome the bias force in the resilient support means to move the roller member toward the drive capstan; and
 a single adjustment means connected between the two spring members whereby the magnitude of the bias force of the resilient support means is adjustable easily and readily.

3. In a tape handler apparatus for processing information-bearing tape including,
 transducer means adapted to transfer coded information between information processing apparatus and an elongated moving web;
 a drive capstan including a motive power source to cause rotational movement therein; and
 a pinch roller drive mechanism supported in a predetermined spacial relationship with the drive capstan;
said pinch roller drive mechanism comprising:
 a roller member formed of a predetermined material;
 resilient spring means including mounting means at one end and support means for the roller member at the opposite end to permit the roller member to be moved toward the drive capstan with a predetermined bias force for pinching a web to cause the web to move relative to the transducer means;
 electromagnetic means to actuate the roller member to cause it to overcome the bias force of the resilient support means to move the roller member toward the drive capstan; and
 a single adjustment means whereby the magnitude of the bias force of the resilient support means is adjustable easily and readily.

4. In a tape handler apparatus for processing information-bearing tape including, transducer means adapted to transfer coded information between information-processing apparatus and an elongated web;

a drive capstan adapted to develop relative movement between the transducer means and the elongated web; and a pinch roller drive mechanism supported in a predetermined spacial relationship with the drive capstan;

said pinch roller drive mechanism comprising:

a roller member formed of a predetermined material including a support bracket for supporting the roller member rotationally;

resilient support means including two spring members attached to the support bracket in spaced apart relationship relative to the direction of movement for the roller member and having a preset bias tension force;

electromagnetic means to cause the support bracket to be moved against a bias force developed by the spring members for moving the roller member toward the drive capstan to pinch a web therebetween causing relative movement between the web and the transducer means; and a single adjustment means between the two spring members whereby the magnitude of the bias force of the resilient support means is adjustable easily and readily.

5. In a tape handler apparatus for processing information-bearing tape including, transducer means adapted to transfer coded information between information processing apparatus and an elongated moving web;

a drive capstan including a motive power source to cause rotational movement therein; and a pinch roller drive mechanism supported in a predetermined spacial relationship with the drive capstan;

said pinch roller drive mechanism comprising:

a roller member formed of a predetermined material having high frictional characteristics;

a support bracket to support said roller member for rotational movement;

said support bracket including two flanges spaced apart from each other and extending in a direction substantially at right angles to the direction of movement of said roller member;

two flat leaf springs, one leaf spring being attached at one end to one flange and the other leaf spring being attached at one end to the other flange;

the opposite ends of the two leaf springs being attached to a fixed block so that the two leaf springs extend substantially parallel to each other;

one of the leaf springs being adapted to support a magnetic armature;

an electromagnetic member supported a predetermined distance from said armature whereby said armature is deflected when the electromagnetic member is energized to cause the roller member to move toward the drive capstan for pinching a web to cause the web to move relative to the transducer means; and a single adjustment attached to both of the leaf springs whereby a bias force is developed in the leaf springs.

6. In a tape handler apparatus for processing information-bearing tape including, transducer means adapted to transfer coded information between information processing apparatus and an elongated moving web;

a drive capstan including a motive power source to cause rotational movement therein; and a pinch roller drive mechanism supported in a predetermined spacial relationship with the drive capstan;

said pinch roller drive mechanism comprising:

a roller member formed of a material having predetermined frictional characteristics;

a support bracket adapted to support the roller member rotationally and including at least two members;

means to adjust the relative position between the two members of said support bracket whereby the angular position between the roller member and the drive capstan is set in a predetermined manner;

one of said members of the support bracket having two flanges spaced apart from each other and extending in a direction substantially at right angles to the direction of movement of the roller member;

two leaf springs for supporting the support bracket resiliently with a predetermined bias force;

a block member to fixedly support the leaf springs at one end in a spaced apart relationship relative to each other so that the leaf springs extend therefrom substantially parallel to each other;

means to attach the opposite ends of the leaf springs, respectively, to the spaced apart flanges on said one of the two members of the support bracket;

electromagnetic means to deflect the support bracket causing the roller member to be moved toward the drive capstan for pinching a web to cause the web to move relative to the transducer means; and a single adjustment means attached to the leaf springs whereby the magnitude of the bias force developed by the leaf springs is adjustable easily and readily.

7. In a tape handler apparatus for processing information-bearing tape including, transducer means adapted to transfer coded information between information processing apparatus and an elongated moving web;

a drive capstan including a motive power source to cause rotational movement therein; and a pinch roller drive mechanism supported in a predetermined spacial relationship with the drive capstan;

said pinch roller drive mechanism comprising:

a roller member formed of a material having predetermined frictional characteristics;

a support bracket to support the roller member rotationally and including means to adjust the angular position between the axis of the roller member and the axis of the drive capstan;

two spaced apart leaf springs fixedly attached at one end and attached, respectively, at the opposite end to said support bracket whereby the support bracket is resiliently moveable with a preset bias force for moving the roller member toward the drive capstan;

means to actuate the roller member to cause it to overcome the bias force in the two leaf springs to move the roller member toward the drive capstan; and a single adjustment means including a threaded member extending through a fixed portion of the mechanism and having members to bear respectively against each of the leaf springs whereby the magnitude of the bias force of the leaf springs is adjustable easily and readily.

8. In a tape handler apparatus for processing information-bearing tape including:

transducer means adapted to transfer coded information between information processing apparatus and an elongated moving web;

a drive capstan including a motive power source to cause rotational movement therein; and a pinch roller drive mechanism supported in a predetermined spacial relationship with the drive capstan;

said pinch roller drive mechanism comprising:

a roller member formed of a predetermined material;

a support bracket to support the roller member and including means to adjust the bracket to a predetermined angular relationship between the axis of the roller member and the axis of the drive capstan;

resilient support means for the roller member including two flat leaf springs having a bias force therein and spaced apart relative to each other and fixedly attached at one end;

means to attach the opposite ends of the two leaf springs to the support bracket of the roller member;

an armature of magnetizable material fixedly attached to the support bracket;

an electromagnetic means including two poles spaced apart from each other in a predetermined spacial relationship with the armature;

a single adjustment means including a threaded member extending between the two leaf springs whereby the magnitude of the bias force of the resilient support is adjustable easily and readily;

a mounting bracket for mounting the mechanism on the tape handler apparatus; and the mounting bracket including means to adjust the gap between the roller member and the drive capstan.

9. In a tape handler apparatus as set forth in claim 8 wherein the mounting bracket includes threaded members for attaching the core of the electromagnet thereto, the core being rotatable for adjusting the planar position between the roller member and the drive capstan.

10. In a tape handler apparatus as set forth in claim 8 including adjustable stop means to pre-set the gap between the armature and the pole of the electromagnet.

11. In a tape handler apparatus for processing information-bearing tape including, transducer means adapted to transfer coded information between information processing apparatus and an elongated moving web;

a drive capstan including a motive power source to cause rotational movement therein; and a pinch roller drive mechanism supported in a predetermined spacial relationship with the drive capstan;

said pinch roller drive mechanism comprising:

a roller member formed of a material having a predetermined frictional characteristic;

resilient support means for the roller member to permit the roller member to be moved toward the drive capstan against a preset bias force for pinching a web to cause the web to move relative to the transducer means;

the resilient support means including a support bracket having relatively movable members whereby the roller member is adjustable in position axially relative to the axial position of the drive capstan so that the two axis may be adjusted substantially parallel to each other, and two leaf springs spaced apart from each other and attached at one end to the support bracket;

a block member having portions extending in opposite directions from each other to fixedly support the opposite ends of the two springs;

a mounting bracket having a flange to support the block member and to support two magnetic poles;

means to attach the mounting bracket to the tape handler apparatus at an adjustable planar position and including a threaded member having a cam to adjust the gap between the roller member and the drive capstan;

an electromagnet having two magnetic poles supported by the mounting bracket;

an armature spanning the distance between the two poles and supported by the movable bracket;

a bar mounted between the two poles of the magnet and having a threaded aperture substantially centrally therein;

a threaded member within the centrally located aperture of the bar to provide a limit stop for adjusting the gap between the armature and the two poles;

the movable bracket having means therein permitting access to the threaded member for adjusting the gap between the armature and the two poles;

a hub extending from the block intermediate of the poles and having a thread opening therein; and a threaded member extending through the threaded opening in the hub including portions to bear against each of the leaf springs for adjusting the magnitude of the bias force in the springs.

References Cited in the file of this patent

UNITED STATES PATENTS

| | | |
|---|---|---|
| 2,864,609 | Trimble | Dec. 16, 1958 |
| 3,035,748 | Van Vechten | May 22, 1962 |